United States Patent [19]

Earsley

[11] 4,225,199
[45] Sep. 30, 1980

[54] BALL SEPARATOR FOR BALL BEARING

[76] Inventor: Melvin L. Earsley, 616 E. Slaton Rd., Lubbock, Tex. 79404

[21] Appl. No.: 942,601

[22] Filed: Sep. 15, 1978

[51] Int. Cl.$^3$ ............................................. F16C 33/38
[52] U.S. Cl. .................................................. 308/201
[58] Field of Search ....................... 308/199, 201, 217

[56] References Cited

U.S. PATENT DOCUMENTS

| 1,281,244 | 10/1918 | Pruyn | 308/201 |
| 1,285,867 | 11/1918 | Wilson | 308/201 |
| 1,303,479 | 5/1919 | Hultgren et al. | 308/201 |
| 3,141,711 | 7/1964 | Biedinger | 308/201 |
| 4,019,790 | 4/1977 | Earsley et al. | 308/201 |
| 4,133,588 | 1/1979 | Earsley | 308/201 |

FOREIGN PATENT DOCUMENTS

| 1198221 | 12/1959 | France | 308/201 |
| 91197 | 10/1921 | Canada | 308/201 |

Primary Examiner—Richard R. Stearns
Attorney, Agent, or Firm—Peter J. Murphy

[57] ABSTRACT

A primarily radial load ball bearing includes an assembly of outer and inner races having confronting raceways for a plurality of balls, and a unitary ball separator fabricated of a moldable material such as nylon. The separator is a ring-shaped member having an annular base, and having annularly spaced finger projecting axially from the base to provide annularly spaced ball pockets. The separator is configured to be received between the races to separate and space the bearing balls in the bearing. The wall surfaces of the ball pockets are made up of a plurality of adjacent surface segments, which segments may be planar, cylindrical or spherical and which are configured to provide ball contact areas and to provide recesses between and adjacent to those ball contact areas for retaining lubricating grease. The surface segments may be arranged sequentially around the circumference of the pocket, may be circumferentially extending segments arranged side-by-side, or may present a checker work of segments defining the pocket surface. For each configuration, the effective diameter of the pocket is slightly larger than that of the ball retained therein to provide minimal clearance with the ball.

14 Claims, 29 Drawing Figures

BALL SEPARATOR FOR BALL BEARING

BACKGROUND AND SUMMARY OF THE INVENTION

This invention relates to ball separators for use in ball bearings; and more particularly to molded plastic ball separators having means to minimize friction between the separator and the balls. The term "ball separator" refers to a component of a ball bearing assembly which is also commonly known by the names "ball retainer" and "bearing cage".

The use of ball bearing assemblies including ball retainers fabricated from molded plastic and having spherical or cylindrical pockets is well known. In such bearing assemblies, if the clearance between the balls and the ball pockets is too large, the bearing is quite noisy. Conversely, if the clearance is too small, it is difficult to retain lubricant between the surfaces of the balls and the ball pockets resulting in excessive heat buildup due to friction. A problem related to excessive heating of the bearing and separator, is that with a molded plastic type of separator the separator extends much more rapidly with heat than does the steel races of the assembly. The inherent result is that the radial expansion of the separator ring is significantly greater than the radial expansion of the races; and with small clearance between the separator pockets and the balls this unequal expansion may create binding and more friction, thereby aggravating the overheating problem.

A particular problem with respect to bearing retainers having spherical pockets, is that the relatively sharp edges of the spherical pockets act to wipe lubricant from the balls, thereby reducing the effectiveness of the lubricant and further aggravating the overheating problem.

While these problems may be alleviated by increasing the ball to ball pocket clearance, this produces a relatively loose separator resulting in separator vibration and resultant noise. The resultant separator noise may raise the overall bearing noise to an unacceptable level, particularly at high speed.

A principal object of this invention therefore is to provide an improved ball separator which overcomes the problems and disadvantages of prior art separators discussed above.

Another of this invention is to provide an improved molded plastic bearing separator having pocket surfaces which enable minimum clearance between the ball pocket surface and the balls and at the same time to reduce the surface contact area.

A further object of this invention is to provide an improved ball separator having ball pocket surfaces providing tangential ball contact areas, and defining lubricant retaining recesses between the ball contact areas.

A further object of this invention is to provide an improved molded plastic ball separator wherein the ball pockets have means for retaining lubricant for deposit to the ball surfaces and wherein the pocket configuration minimizes the effect of wiping lubricant from the ball surfaces.

Another object of this invention is to provide an improved ball bearing retainer which provides reduced starting torque for the bearing assembly.

Still another object of this invention is to provide an improved molded plastic ball separator for a ball bearing assembly which reduces ball contact areas, reduces friction, and reduces noise, and which is economic to fabricate.

These objects are accomplished in a ball separator for use in a ball bearing which includes confronting first and second races and a plurality of spherical balls coacting with said races. The ball separator includes an annular base, and includes a plurality of annularly spaced fingers projecting from the annular base to define individual annularly spaced ball pockets. The ball separator has opposite side walls which are configured to be received between the outer and inner races of the ball bearing with the side walls confronting respective races. Each of the ball pockets is formed to partially enclose a respective ball, and has a wall surface configured to provide clearance between the pocket and the ball. Each ball pocket wall surface comprises a plurality of surface segments providing ball contact areas; and the surface segments define lubricant retaining recesses between and adjacent to the ball contact areas.

More particularly the surface segments may be contiguous to each other, and may be planar, cylindrical, or spherical providing tangential contact areas.

The novel features and the advantages of the invention as well as additional objects thereof will be understood more fully from the following description when in connection with the accompanying drawings.

DRAWINGS

FIG. 3b is a transverse sectional view taken along the line 3b—3b of FIG. 3a;

FIG. 4b is a transverse sectional view taken along the line 4b—4b of FIG. 4a;

FIG. 5b is a transverse sectional view taken along the line 5b—5b of FIG. 5a;

FIG. 6b is a transverse sectional view taken along the line 6b—6b of FIG. 6a;

FIG. 7b is a transverse sectional view taken along the line 7b—7b of FIG. 7a;

FIG. 8b is a transverse sectional view taken along the line 8b—8b of FIG. 8a;

FIG. 9b is a fragmentaary sectional view taken along the line 9b—9b of FIG. 9a;

FIG. 10b is a transverse sectional view taken along the line 10b—10b of FIG. 10a.

FIG. 11b is a transverse sectional view taken along the line 11b—11b- of FIG. 11a.

DESCRIPTION OF THE PREFERRED EMBODIMENTS

Figure 1:
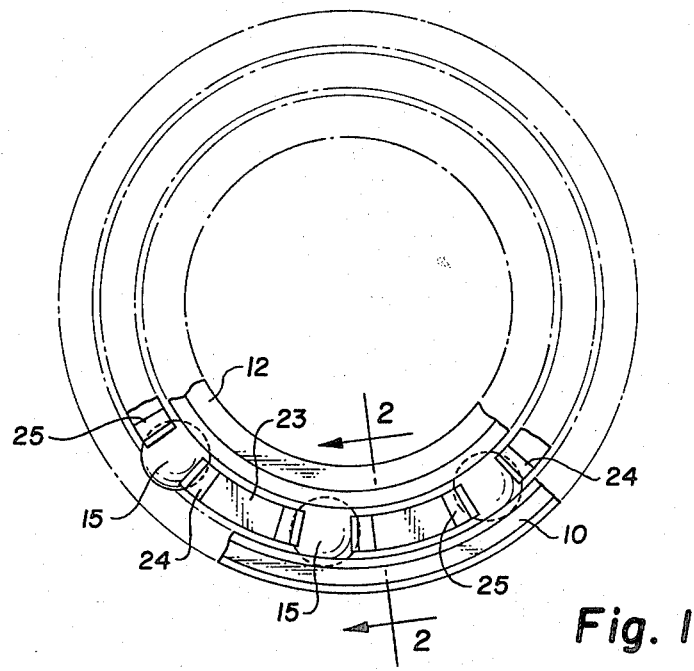
FIG. 1 is a plan view of a bearing assembly including a ball separator according to the invention.

In the drawings and in the following specification there is described, by way of example, a ball bearing designed for primarily radial loads; and the ball separators illustrated and described for use in such bearing are preferred forms of ball separators according to the invention. It is to be understood, however, that ball separators according to the invention could be designed for use in other types of bearings such as so-called angular contact ball bearings which are designed to support substantial axial thrust loads as well as radial loads. The claims presented in this application are not intended to be limited to primarily radial load bearings, except where the claim language clearly recites such structure.

In the following description, the ball separators which are described are identical except for the different forms or configurations of the wall surfaces of the ball pockets. A number of different configurations of wall surfaces are described; however, a common feature is that each pocket surface is made up of a plurality of surface elements which are referred to as "surface segments" and which are disposed contiguous to each other to define the overall pocket wall surface. Each individual surface element or segment is either planar or has a curvature so related to the curvature of the bearing ball that, when the ball contacts a surface segment the contact is at a tangential area of that segment. In most cases that tangential contact area is an isolated or island area, such as where the surface segment is planar; and in other examples the contact area may be an elongated continuous area such as where the surface of the segment is cylindrical and generated about substantially the same radius as that of the ball. The configurations of the surface segments are many and varied, of which the following described segments are but a few examples.

Figure 2:
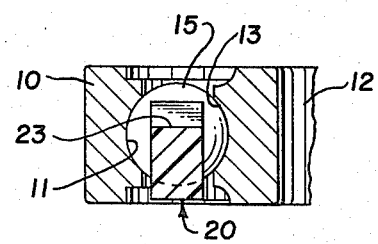
FIG. 2 is a transverse sectional view of the bearing assembly taken along the line 2—2 of FIG. 1.

Referring now particularly to FIGS. 1 and 2 of the drawing, the ball bearing assembly includes: an outer race 10 which is a generally cylindrical ring having an arcuate raceway or groove 11 on its inner wall; an inner race ring 12 having an arcuate raceway or groove 13 on its outer wall; with these inner and outer races and the associated raceways being so dimensioned to confine the bearing balls 15 when in assembled relation.

The inner and outer races and the bearing balls are fabricated from suitable bearing metals as are well known. A ball separator 20, as its name implies, performs the function of separating the several balls 15 from each other in the ball bearing assembly; and for this purpose provides annularly spaced pockets for the balls. In separators described each of the pockets includes means for retention on its respective ball, to provide for maximum retention of the separator in the bearing assembly. The ball retainer 20, according to the invention, is a unitary member fabricated from a suitable material, capable of being molded by a suitable technique such as injection molding. One appropriate material is a heat stabilized nylon material, which is properly annealed and stabilized for bearing applications.

Figure 3:
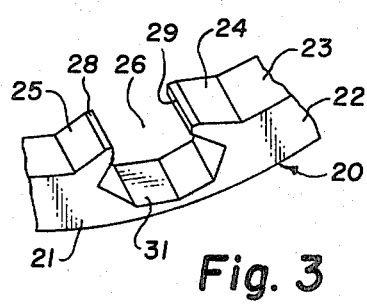
FIG. 3 is a fragmentary perspective view of one form of ball separator according to the invention wherein the segments are planar.

Referring particularly to FIGS. 1 through 3 of the drawings, the ball separator 20 is an annular member including a continuous base 21, defining a base plane which is perpendicular to the central axis of the ball separator, and including a plurality of annularly spaced fingers 22 which extend axially from the base 21 to define, with the base, annularly spaced pockets 26. The separator base and fingers have common inner and outer cylindrical wall surfaces, providing a wall thickness which is considerably less than the diameter of the balls 15 so that the entire separator is received between the inner and outer races with suitable clearance.

Each of the fingers 22 includes a pedestal 23 for a pair of annularly separated projecting ears 24 and 25. The pedestal is identified in the drawings by its terminal surface 23, and these pedestal surfaces 23 for all of the fingers are disposed in a common plane which is parallel to the plane of the base. As illustrated in FIG. 2, this plane of the pedestals 23 is preferably disposed slightly above the parallel plane which would be defined by the centers of the ball pockets 26.

Referring to further structural details of the ears 24 and 25, as best seen in FIG. 3 the distal ends of the ears have flat tips 28; and these tips 28 are disposed in a common plane which is parallel to the plane of the pedestals and of the base. It will also be seen that the lips 29 defined by the junctures of the flatted tips 28 and the pocket walls are also flatted or beveled to relieve what would otherwise be a relatively sharp lip; and these lip surfaces may be generally cylindrical or planar and perpendicular to the base, depending on the pocket wall surface configuration which will be described.

The above described configuration of the ears 24 and 25 which project from the pedestals 23, is by way of illustration only; and reference may be had to U.S. Pat. No. 4,019,790, issued Apr. 26, 1977, for a description of various other forms of ears which may be formed to project from the pedestals 23 for other desired forms of ball separators according to the invention, such as maximum complement ball separators.

The drawings illustrate several forms of pocket wall surface configurations. For all forms it will be seen from the drawings that the circumferential extent of the pockets is something greater than 180°, the pocket wall surfaces terminating with the lips 29 which are spaced apart a distance less than the diameter of the ball 15 which is received in the pocket. The ears 24 and 25 are yieldable, of course, to enable the separator to be snapped into the bearing assembly and the respective balls to enter each pocket. Once this assembly is completed the separator is retained within the bearing assembly by the ears. Since the above described elements of the separator 20 are common to all described forms, different forms of the separator 20 will be identified by subscripts A, B, etc.

Figure 3A:
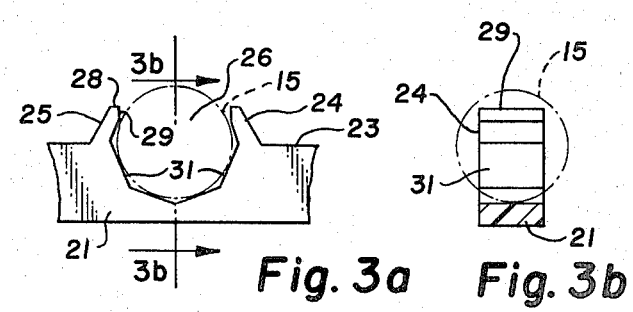
FIG. 3a is a fragmentary side view of that form.
Figure 3B:
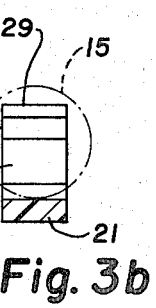

FIGS. 3, 3a and 3b illustrate one form of pocket surface configuration wherein the pocket surface is polygonal, more particularly octagonal. The pocket surface consists of five octagonal planar segments 31 and the confronting surface of the ears 24 and 25. This pocket defines what is referred to as a "straight through" pocket in that all of the surfaces which make up the pocket are parallel with the radius of the retainer 20. Particularly, in this particular embodiment, each of the segments 31 is planar and parallel with a radius of the retainer which passes through the center of the pocket for example. For this configuration, the contact areas for the ball and socket would be the center areas of each segment 31. At the juncture of each pair of adjacent segments 31 a recess is formed, relative to the spherical surface of the bearing ball 15, for retaining grease or other lubricant which is then available as needed for application to the surface of the ball 15.

Figure 4:
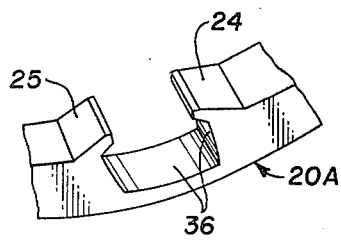
FIG. 4 is a fragmentary perspective view of another form of ball separator, wherein the surface segments are cylindrical generated about axes parallel to a radius of the separator.
Figure 4A:
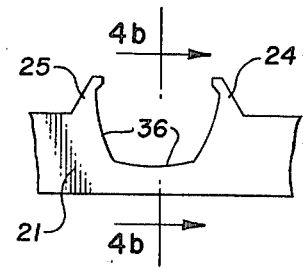
FIG. 4a is a fragmentary side view of that form.
Figure 4B:
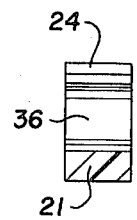

FIGS. 4, 4a and 4b illustrate a ball retainer 20A with another form of pocket surface configuration which might be referred to as a modified polygonal pocket. A particularly illustrated form is pentagonal; and this is another form of straight through pocket which differs in that the pocket segments 36 are cylindrical rather than planar. The cylindrical surfaces are generated about radii which are parallel to a radius of the separator which passes through the center of the ball pocket. The radii of the surface segments 36 are, however, substantially greater than the radius of the ball to be retained in the pocket, so that the contact areas are tangent areas located about the center of each of the segments 36. Here again the junctures of adjacent segments 36 define recesses relative to the surface of the ball which retain grease to be applied to the ball surface as needed.

Figure 5:
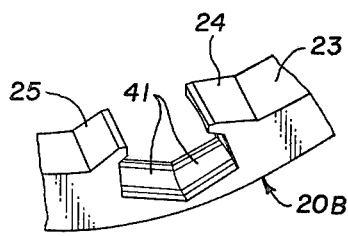
FIG. 5 is a fragmentary perspective view of another form of ball separator wherein the segments are cylindrical, generated about axes perpendicular to radii of the ball separator.
Figure 5A:
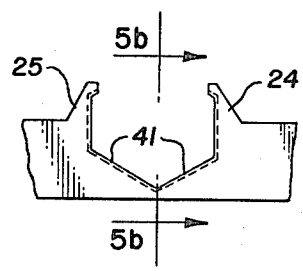
FIG. 5a is a fragmentary side view of that form.
Figure 5B:
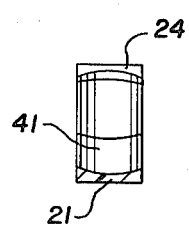

FIGS. 5, 5a and 5b illustrate another form of separator 20B which might also be referred to as a modified polygonal pocket but which is not a straight through pocket as described above. In this particular form the pocket is hexagonal consisting of four hexagonal segments 41, with the remainder of the pocket periphery defined by the inner faces of the ears 24 and 25. In this form, the segments 41 are cylindrical, being generated however about axes which are transverse to a radius of the separator passing through the center of the pocket. The radii of these cylindrical segments 41 may be only slightly larger than the radius of the ball 15 to be retained in which case the contact areas will be transverse tangent line areas centered on each segment. Alternatively, the radii of these cylindrical segments 41 may be substantially larger than the radius of the ball 15 in which case the ball contact areas will again be tangent areas centered on the segments 41. Since this pocket is polygonal as viewed from the side, as seen in FIG. 5a, any tendency of the sharp edges of the pocket to wipe lubricant from the ball surface will be minimized. Again the junctures between adjacent segments provide recesses for retaining lubricant.

Figure 6:
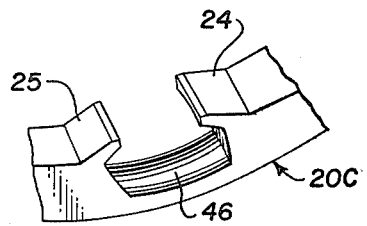
FIG. 6 is a fragmentary perspective view of another form of ball separator wherein the surface segments are spherical.
Figure 6A:
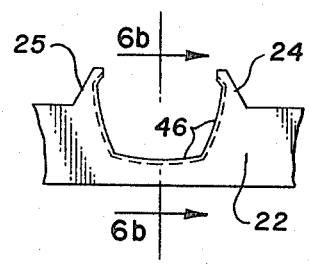
FIG. 6a is a fragmentary side view of that form.
Figure 6B:
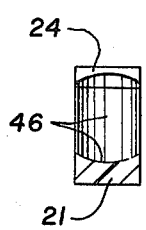

FIGS. 6, 6a and 6b illustrate a separator 20C incorporating a pocket configuration which might be referred as still another modified polygonal configuration. For this form the pocket is again pentagonal, with the pocket surface being formed by three pentagonal segments 46 and the inner faces of the ears 24 and 25. In this form the surface segments 46 are spherical, being generated about radii which are substantially larger than the radius of the ball to be retained. Here again the ball contact areas would be tangential areas located at the approximate center of each segment 46.

Figure 7:
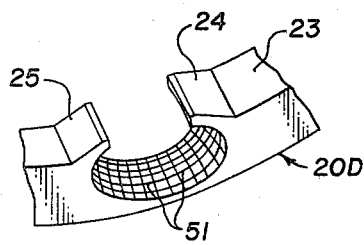
FIG. 7 is a fragmentary perspective view of another form of ball separator including many small planar segments.
Figure 7A:
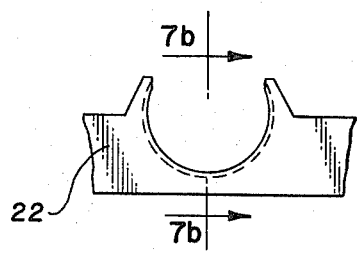
FIG. 7a is a fragmentary side view of that form.
Figure 7B:
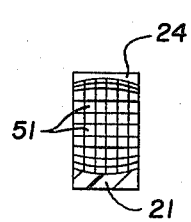

FIGS. 7, 7a and 7b illustrate a separator 20D wherein the pocket wall surface is formed by a checker work of small planar segments 51 which in the illustrated form are generally rectangular or square. Here the general configuration of the pocket wall surface may be said to be generally spherical having an effective radius slightly larger than the radius of the ball to be retained; but wherein the spherical surface is defined by discrete planar segments 51. As with the other forms, the junctures between adjacent segments form recesses for retaining grease; and in the particular form the recesses are, of course, considerably shallower but are much larger in number.

Figure 8:
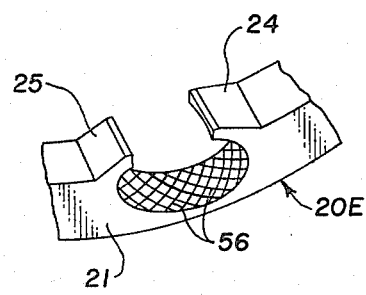
FIG. 8 is a fragmentary perspective view of another form of ball separator including many small planar surface segments.
Figure 8A:
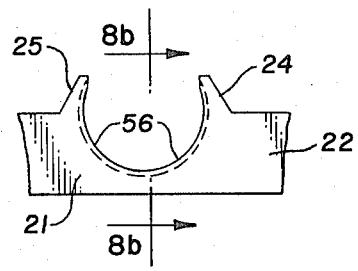
FIG. 8a is a fragmentary side view of that form.
Figure 8B:
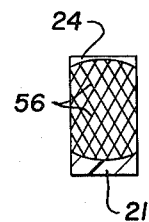

FIG. 8 illustrates a separator 20E which is quite similar to the separator 20D wherein the pocket surface is defined by a large number of small planar segments 56, but wherein the segments are generally diamond-shaped as opposed to being generally rectangular. Here again the overall pocket surface is generally spherical, with the effective diameter being slightly larger than the diameter of the ball 15 to be retained.

Figure 9:
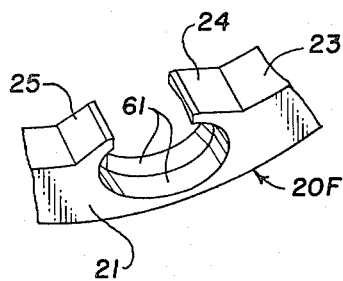
FIG. 9 is a fragmentary perspective view of another form of ball separator having side-by-side frusto-conical surface segments.
Figure 9A:
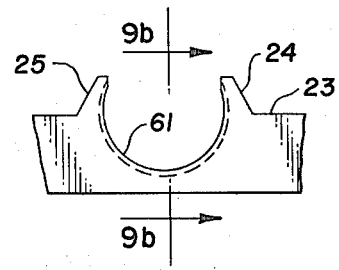
FIG. 9a is a fragmentary side view of that form.
Figure 9B:
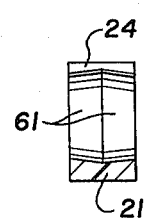

FIGS. 9, 9a and 9b illustrate a retainer 20F having a considerably different form of pocket surface configuration. Here the pocket surface consists of only a pair of segments 61 which are frusto-conical segments circumambienting the pocket. These segments define a single juncture line which also circumambients the pocket and defines a deep recess for retaining grease. The contact areas would be tangent lines which also circumambient the pocket; and the substantial clearance between the segments and the ball surface at the sides of the pockets provide further grease retaining areas of the pockets. The dimensions of the frusto-conical segments are such that only a slight clearance is maintained between the ball and the segments along the contact tangent lines.

Figure 10:
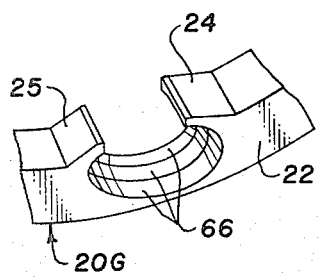
FIG. 10 is a fragmentary perspective view of another form of ball separator including side-by-side frusto-conical and cylindrical segments.
Figure 10A:
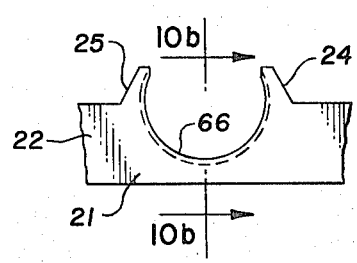
FIG. 10a is a fragmentary side view of that form.
Figure 10B:
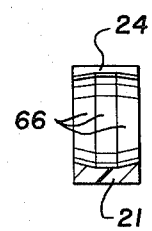

FIGS. 10, 10a and 10b illustrate a separator 20G which is generally similar to the separator 20F except that it includes three side-by-side surface segments 66, the center segment of which is cylindrical and the outer segments of which are frusto-conical. Here again the segments circumambient the pocket and the two junctures define two circumambienting recesses which are relatively deep to retain the lubricant in the same manner as the pocket for the retainer 20F. Again the contact areas are tangent lines, centered on the respective segments, and circumambienting the pocket.

Figure 11:
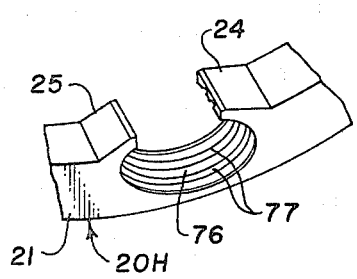
FIG. 11 is a fragmentary perspective view of another form of ball separator including side-by-side spherical segments separated by lubricant retaining grooves.
Figure 11A:
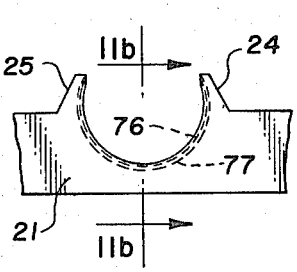
FIG. 11a is a fragmentary side view of that form.
Figure 11B:
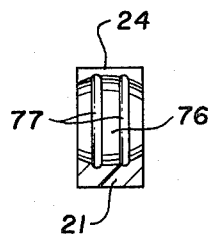

FIGS. 11, 11a and 11b illustrate a separator 20H which is somewhat similar to the separator 20G in that it includes three side-by-side surface segments 76, all of which are spherical being generated about the spherical center of the pocket and about a radius which is slightly larger than the radius of the ball to be retained. Here again the segments circumambient the pocket; however, the segments are separated by two circumambienting grooves 77 which are sufficiently deep to retain a quantity of lubricant. For this configuration, the contact areas are not tangent areas but rather are separated spherical contact areas which are complementary to the spherical surface of the ball. The spherical segments 76 have sufficient clearance with the ball to provide free rotation of the ball and to allow lubricant retained in the grooves 77 to be deposited on the ball surface. The separator 20H then is an example of a separator having a spherical ball pocket comprised of spherical segments separated by lubricant retaining grooves or recesses.

For all of the above described pocket configurations, the pockets are dimensioned such that the effective pocket radius, which is represented by the radii of the contact areas relative to the pocket center, is only slightly larger than the radius of the ball to be retained. The ball 15 then is very closely confined within each pocket, with the amount of contact surface being smaller or greater depending on the particular configuration and on the number of segments for a particular configuration. In any event the amount of contact area is considerably less than that which would exist in a true spherical pocket and which produces certain disadvantages which have been described. With that considerably less surface contact area, the clearance between the ball and the effective diameter of the pocket may be reduced without increasing the danger of heat buildup. This will result for three reasons: (1) there is less contact surface to generate heat, (2) there are inherent lubricant retaining recesses to retain lubricant and apply it to the surface of the balls as needed, and (3) there may be greater clearance at the edges of the pockets so that the lubricant is not removed from the ball surface as the ball rotates relative to the pocket.

By way of example, for a retainer having a conventional spherical pocket, if the clearance is maintained as low as 0.006 inch for example, problems will result due to overheating of the bearing. On the other hand, with pocket surface configurations of the type described, the effective clearance may be reduced to 0.003 inch without creating overheating problems; and the separator having a much snugger fit on the several bearing balls will be a quieter bearing, even discounting the improved lubrication provided.

What has been described are several forms of unitary ball separators which can be molded from a resilient or yieldable plastic material, and which have a number of advantages over prior art ball separators.

A principal advantage is that the amount of pocket surface which contacts the surface of the bearing ball is greatly reduced over that of a conventional spherical pocket, to minimize heat buildup due to friction, and yet provide sufficient bearing contact between the separator and the balls to maintain the integrity of the assembly and minimize any vibration of the separator which would produce excessive noise.

A resultant advantage of the reduced contact area is that the clearance between the bearing balls and the effective diameter of the pockets may be reduced, and this further minimizes any tendency of the separator to vibrate relative to the balls and to produce undesirable or unacceptable noise.

A particular advantage of the pocket surface design is the provision of surface recesses or pockets between the ball contact areas which retain grease and apply grease to the ball surfaces as needed, which in conjunction with the reduced contact area, serves to minimize the friction and heat buildup. An ancillary feature is that with most of the described forms, there is greater clearance between the pocket surface and the ball surface at the edges of the pockets so that there can be no contact between the pocket edges and the ball surfaces which act to wipe the lubricant from the ball surfaces.

An advantage in the use of bearings embodying separators according to the invention is that the starting torque will be greatly reduced.

While preferred embodiments of the invention have been illustrated and described, it will be understood by those skilled in the art that changes and modifications may be resorted to without departing from the spirit and scope of the invention.

What is claimed is:

1. In a ball separator for use in a ball bearing which includes confronting first and second races, and a plurality of spherical balls coacting with said races; said ball separator including an annular base, and a plurality of annularly spaced fingers projecting generally axially from said annular base to define individual annularly spaced ball pockets; said ball separator having opposite side walls, and being configured to be received between the outer and inner races of said ball bearing with said side walls confronting respective races; each of said ball pockets being formed to partially enclose a respective ball, and having a wall surface configured to provide clearance between the pocket and the ball; the improvement comprising: each ball pocket wall surface comprising a plurality of contiguous surface segments, each providing a tangential ball contact area, and said surface segments defining lubricant retaining recesses between said ball contact areas.

2. A ball separator as set forth in claim 1 said ball separator being a unitary member fabricated from a moldable plastic material.

3. A ball separator as set forth in claim 1 said surface segments being arranged sequentially around the circumference of the pocket.

4. A ball separator as set forth in claim 3 said surface segments being planar, and defining a polygonal straight through pocket.

5. A ball separator as set forth in claim 3 said surface segments being concave cylindrical, generated about parallel axes and radii larger than the radius of the ball.

6. A ball separator as set forth in claim 3 said surface segments being concave cylindrical, generated about axes perpendicular to radii of the separator.

7. A ball separator as set forth in claim 1 said surface segments being concave spherical, generated about radii larger than the radius of the ball.

8. A ball separator as set forth in claim 1 said surface segments being arranged in a checkerwork; said pocket wall surface being generally spherical and having an effective radius slightly larger than the radius of the ball.

9. A ball seperator as set forth in claim 8 said checkerwork comprising generally rectangular segments circumambienting said pocket.

10. A ball separator as set forth in claim 8 said checkerwork comprising diamond-shaped segments circumambienting said pocket.

11. A ball separator as set forth in claim 1 said surface segments comprising a plurality of side-by-side segments each circumambienting the pocket.

12. A ball separator as set forth in claim 11 said surface segments comprising a plurality of frusto-conical segments.

13. A ball separator as set forth in claim 11 said segments comprising a combination of a cylindrical segment and a plurality of frusto-conical segments.

14. A ball separator as set forth in claim 1 certain of said fingers including at least one ear projecting into an adjacent pocket, whereby certain of said pockets are partially defined by reentrant ears of its associated fingers.

* * * * *